Figure 1:
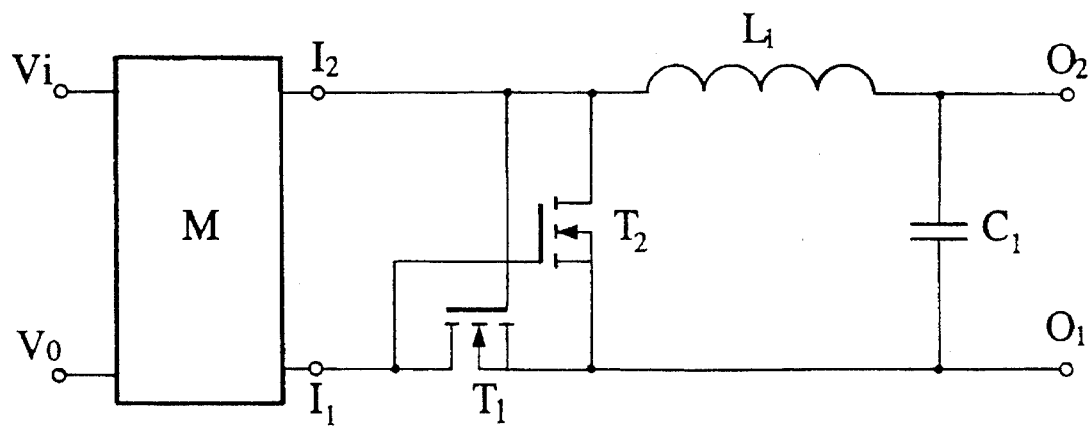

United States Patent [19]

Vazquez Lopez et al.

[11] Patent Number: 5,535,112
[45] Date of Patent: Jul. 9, 1996

[54] DC/DC CONVERSION CIRCUIT

[75] Inventors: Manuel Vazquez Lopez, Tres Cantos; Enrique De La Cruz Moreno, Madrid; Julio Rodriguez Perez, Fuenlabrada, all of Spain

[73] Assignee: Alcatel N.V., Amsterdam, Netherlands

[21] Appl. No.: 220,018

[22] Filed: Mar. 30, 1994

[30] Foreign Application Priority Data

Mar. 31, 1993 [ES] Spain ..................................... 9300668

[51] Int. Cl.$^6$ ............................................. H02M 3/338
[52] U.S. Cl. .................................................. 363/20
[58] Field of Search ............................... 363/20–21, 56, 363/60, 61, 97, 95, 98; 361/90–93, 143, 149; 307/91, 104

[56] References Cited

U.S. PATENT DOCUMENTS

| | | |
|---|---|---|
| 4,951,186 | 8/1990 | Brakus et al. .......................... 363/21 |
| 5,075,837 | 12/1991 | Feldtkeller ............................. 363/19 |
| 5,170,040 | 12/1992 | Wirtz et al. ............................ 219/497 |

Primary Examiner—Peter S. Wong
Assistant Examiner—Aditya Krishnan
Attorney, Agent, or Firm—Sughrue, Mion, Zinn, Macpeak & Seas

[57] ABSTRACT

A DC/DC conversion circuit of the type that implements the "forward PWM" topology includes a DC/AC converter, a self-driven synchronous rectifier which rectifies the alternating voltage signal coming from the DC/AC converter, and a filter that filters the rectified signal, thereby obtaining the DC output voltage from the DC/DC conversion circuit. This DC/DC conversion circuit is characterized in that the DC/AC converter includes means to generate an alternating signal with a square waveform that does not take zero instantaneous values such that no current flows through the body diode of either of the transistors of the self-driven synchronous rectifier.

7 Claims, 4 Drawing Sheets

DC/DC CONVERSION CIRCUIT

OBJECT OF THE INVENTION

This invention, according to the title of this document, refers to a highly efficient DC/DC conversion circuit with "forward PWM" topology which comprises a DC/AC converter, a self-driven synchronous rectifier and a filter, and which increases the power efficiency of the whole assembly.

The circuit, according to the invention, is of particular application to direct current supply converters for low output voltages where the efficiency is greatly affected by losses in the rectification stage.

BACKGROUND TO THE INVENTION

There are several topologies used for the implementation of DC/DC converters. One of the most frequently employed, termed "forward PWM", is shown in the applications notes of Philips Components, "Power Semiconductor Applications", April 1991, page 2–77.

This topology has a transformer with two windings, where through one of them, hereafter called primary, a pulsed current is caused to flow by means of a transistor connected in series with it and which is switched, alternately, between the switched-on and cut-off states by a signal coming from a control circuit; in this way the other winding, hereafter called secondary, is connected to a rectifier circuit that rectifies the alternating signal coupled into it and thereby performs the DC/DC conversion.

Nonetheless, the voltage drop in the diodes forming part of the rectifier circuit, when the output voltage is low in value, has a very negative influence on the overall efficiency of the converter.

Figure 5:
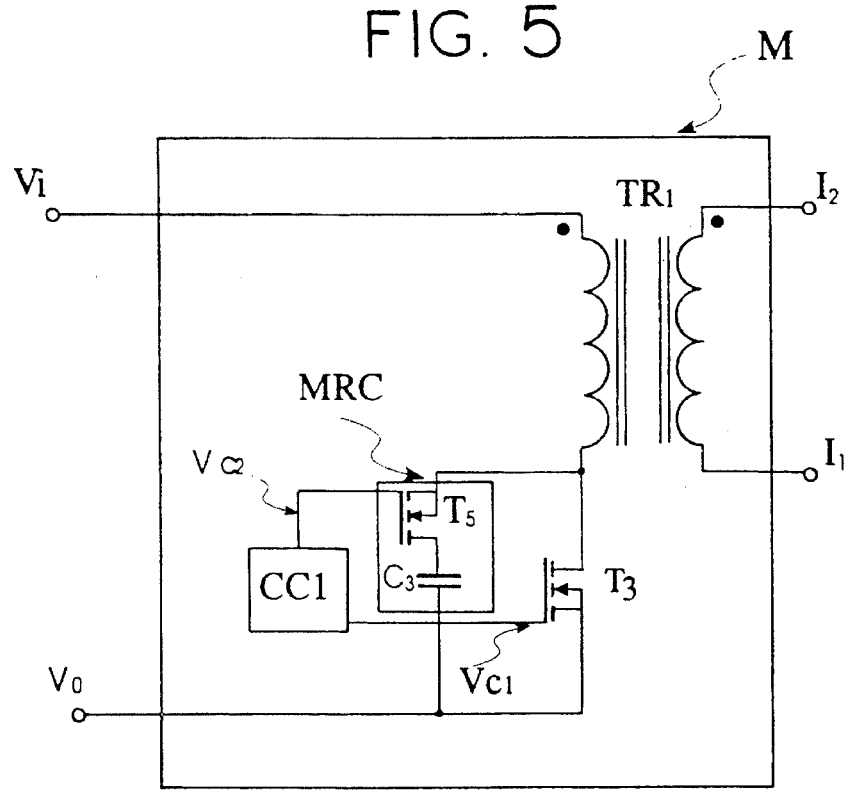

Alternatively, in order to increase the efficiency of the rectifier circuit, a self-driven synchronous rectification process is employed, as illustrated in FIG. 5 on page 2–79 of the publication above mentioned. In this circuit, each of the diodes has been replaced by a MOSFET transistor (also shown with their respective body diodes) that operates in the cut-off and switched-on states in synchronism with the alternating signal coming from the secondary winding of the transformer. The operation of this circuit is well understood by a person skilled in the art.

The current flowing in the primary of the transformer, however, produces a magnetisation in the transformer core that could lead it to saturation and thereby inhibit its operation as such. For this reason, use is made of a conventional demagnetising circuit (not shown), such that the assembly gives rise to a signal with a waveform like that shown in FIG. 2. This signal, which is rectified by a self-driven synchronous rectifier causes one of the transistors to conduct when the voltage is Vp1, and the other to conduct when the voltage is Vp2, in accordance with the desired operating process. At those instants, however, when there is zero voltage in the secondary of the transformer, both transistors are in the cut-off state.

As the inductor in the output filter forces to maintain the current flowing through it constant, this current is supplied through the body diode of the MOSFET transistor whose drain terminal is connected to one end of the inductor. This produces additional losses, made worse by the poor quality of the body diode, that limit the maximum efficiency of the DC/DC conversion circuit to a value that becomes even lower as the required output voltage is lowered.

It is possible to improve this efficiency by connecting a Schottky diode in parallel with the body diode, though the most desirable situation is that no current should flow through either diode.

TECHNICAL PROBLEM TO BE OVERCOME

Consequently the technical problem to be overcome consists in preventing the flow of current through the body diode of the MOSFET transistors in the self-driven synchronous rectifier, thereby reducing its losses and enhancing the overall efficiency of the whole assembly.

CHARACTERISATION OF THE INVENTION

The DC/DC conversion circuit, in accordance with the invention, comprises a DC/AC converter that includes means for generating an alternating signal with a square waveform that does not take zero instantaneous values (i.e., having virtually no period of zero voltage), a self-driven synchronous rectifier and a filter.

In this way, the signal coming from the transformer included in the DC/AC converter makes that the transistors of the self-driven synchronous rectifier are not simultaneously in the cut-off state, which would result in current flowing through the body diode of one of the field-effect transistors. As a consequence, the losses that would arise in this component are considerably lessened and the overall efficiency of the DC/DC converter increased, this increase in practical circuits reaching approximately 4 points.

BRIEF FOOTNOTES TO THE FIGURES

Figure 2:
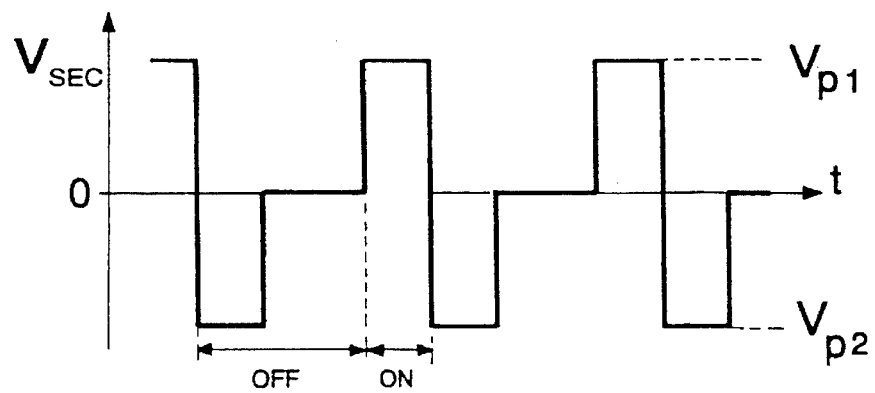
Figure 3:
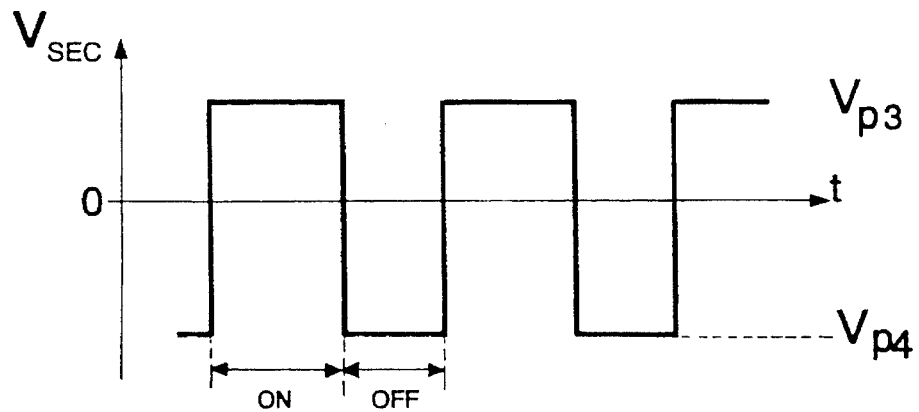
Figure 4:
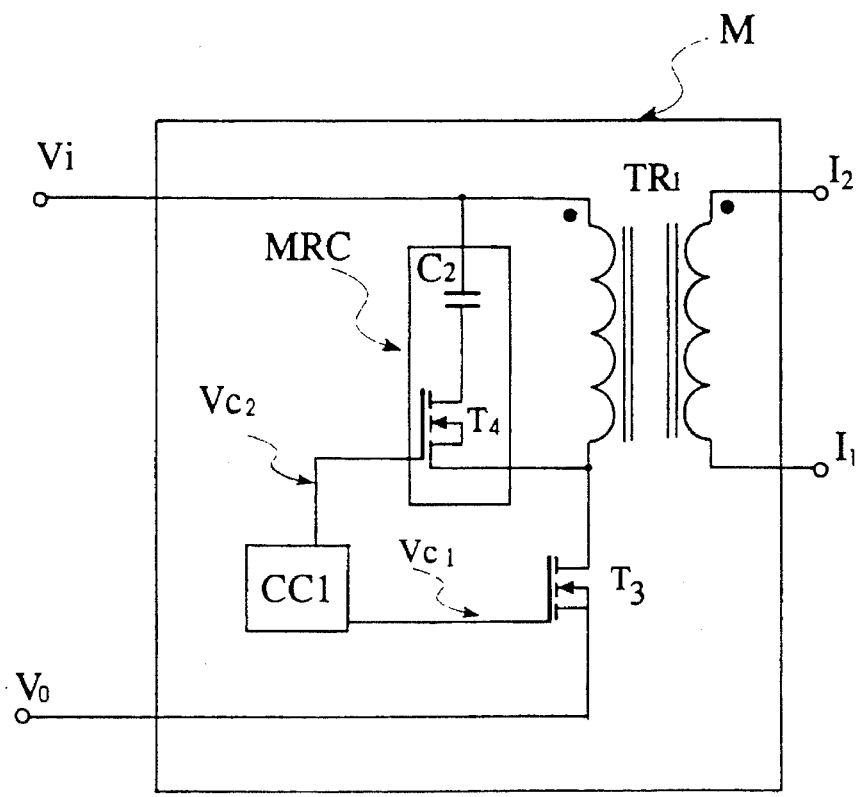
Figure 6:
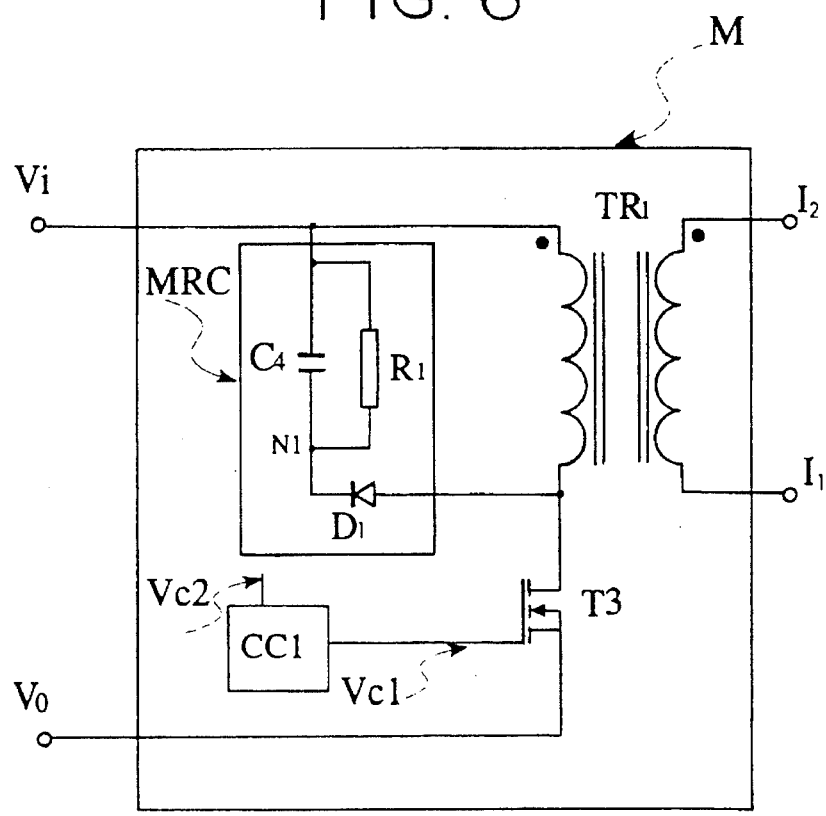
Figure 7:
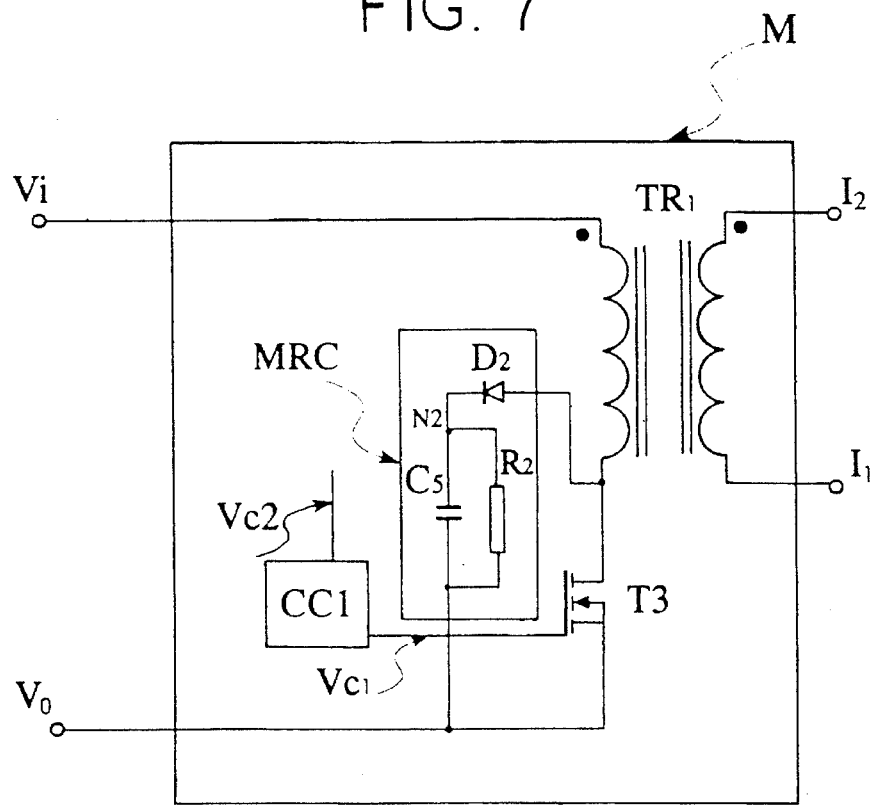
Figure 8:
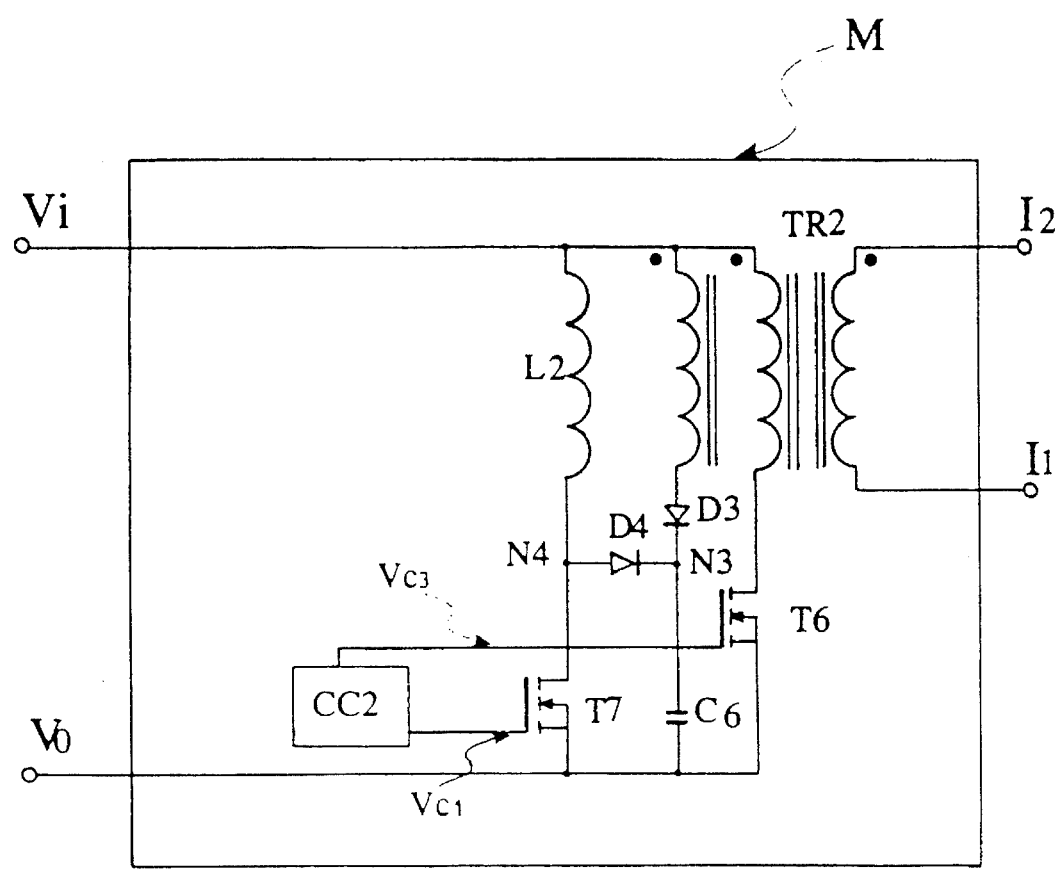

A more detailed explanation of the invention is given based on the following figures in which:

FIG. 1 shows a DC/DC conversion circuit consisting of a DC/AC converter, a self-driven synchronous rectifier and a filter, FIGS. 2 and 3 show the waveforms at the input terminals of the self-driven synchronous rectifier in accordance with the state of the art and with the invention respectively, FIGS. 4 and 5 show two possible implementations of the DC/AC converter that makes use of an active limiter in order to demagnetise the transformer, all in accordance with the invention, FIGS. 6 and 7 show two other possible implementations of the DC/AC converter that make use of a passive limiter, and FIG. 8 shows an alternative implementation of the DC/AC converter that includes a demagnetising circuit for the transformer using an auxiliary winding.

DESCRIPTION OF THE INVENTION

The DC/DC conversion circuit of FIG. 1 consists of a DC/AC converter, M, that generates an alternating signal across its output terminals I1 and I2, that has to be rectified by a rectifier circuit and filtered by a filter in order to obtain the required DC voltage at its output 01,02.

In this case, use is made of a self-driven synchronous rectifier T1,T2 and a filter L1,C1 that considerably reduces the losses in the rectifier elements (transistors T1 and T2 instead of diodes). However, so that the reduction can be as great as possible, it is necessary to avoid the problem stated above whereby the body diode of transistor T2 conducts during the period of time when the voltage across the input terminals I1 and I2 of the self-driven synchronous rectifier is zero.

To avoid the situation described above, the DC/AC converter, M, does not make use of a conventional demagnetising procedure for the output transformer, which would result in an alternating signal with a waveform of the type shown in FIG. 2, instead it includes means to generate an alternating signal with a square waveform that does not take zero instantaneous values (i.e., having virtually no period of zero voltage), of the kind shown in FIG. 3, which avoids a situation of simultaneous cut-off of both transistors T1,T2.

FIG. 4 shows a possible implementation of the DC/AC converter, M, that consists of a transformer TR1 which has one of its windings connected between a DC supply voltage Vi and the drain of a transistor T3 which, in turn, has its source connected to the reference voltage V0, in such a way that this transistor T3 is brought to the cut-off or switched-on state by the application of a control voltage Vc1, with a square waveform, coming from a control circuit CC1.

The pulsed current flowing in this winding acts to magnetise the transformer TR1, which has to be demagnetised in some way to prevent its saturation. This is done making the current flowing through it to go down or, what is the same thing, the derivative of the current becoming negative, such that the mean value of this current does not grow indefinitely, but remains at a determined level around which the instantaneous current varies.

According to the invention, this is achieved by means of a magnetising return current module MRC which is an active limiter formed by the capacitor C2 in series with the drain-source junction of the transistor T4, the latter operating in the cut-off or switched-on state through the application to its gate of a control signal Vc2 coming from the control circuit CC1, this being a complementary signal to the control signal Vc1.

This magnetising return current module MRC is connected between the node that joins the drain of the transistor T3 to one of the terminals of one of the windings of TR1 and a constant voltage node which, in this case, is the DC voltage supply Vi.

When T3 is conducting, the transformer TR1 is magnetised, but while T4 is conducting the transformer is demagnetised.

FIG. 5 is a variation on FIG. 4, in which the constant voltage node to which the magnetising return current module MRC is connected, is, in this case, the reference voltage V0, this module consisting of the capacitor C3 and the transistor T5, its operation being entirely analogous to the previous case.

FIG. 6 shows another possible implementation of the DC/AC converter, M, in which the magnetising return current module MRC is a passive limiter formed by the resistor R1 in parallel with the capacitor C4 and this assembly in series with the diode D1. The cathode of this diode D1 is connected to the node N1 that joins one of the terminals of C4 to one of the terminals of R1 and its anode is connected to the node that joins the drain of T3 to one of the terminals of a winding of TR1; the other terminal of the magnetising return current module MRC, which coincides with the other terminals of C4 and C1, is connected to a constant voltage node which, in this case, is the input voltage Vi.

Similarly, in FIG. 7, the equivalent circuit is shown for the case that the constant voltage node to which one of the terminals of the magnetising return current module MRC is connected, is the reference voltage V0, formed in this case by R2, C5 and D2.

Finally, FIG. 8 shows another implementation of the DC/AC converter, M, that makes use of a transformer TR2 with three windings of which one is an output winding connected to terminals I1 and I2, another has one of its terminals connected to the input voltage Vi while the other terminal is connected in series with the drain of a transistor T6 whose source is connected to the reference voltage V0. This transistor T6 also works in the cut-off or switched-on states through the application of a control signal Vc3, with a square waveform coming from a control circuit CC2.

The demagnetising of the transformer TR2 is done, in this case, by making use of the third winding, which has one of its terminals connected to the input voltage Vi and an auxiliary circuit connected to the other winding. This auxiliary circuit is formed by a diode D3 whose anode is connected to one of the terminals of the third winding of the transformer TR2 and its cathode to the node N3; a capacitor C6 that is connected between the node N3 and the reference voltage V0; an inductor L2 that has one of its terminals connected to the input voltage Vi; a diode D4 that has its anode connected, at node N4, to the other terminal of the inductor L2 and its cathode connected to the node N3; and a transistor T7 that has its drain connected to the node N4 and its source to the reference voltage V0. This transistor T7 receives a control signal Vc4, with the same waveform as control signal Vc3, coming from the control circuit CC2, which causes it to operate in the cut-off and switched-on states.

In this case the transistors T6 and T7 operate such that both are simultaneously cut-off or switched-on; in this way the magnetising produced in the transformer TR2 while T6 is conducting is compensated by the demagnetising produced by the current of the auxiliary circuit formed by D3, D4, L2, L6 and T7 and flowing through the third winding of the transformer TR2.

In this way it is also possible to have the DC/AC converter, M, generate an alternating signal with a square waveform that does not take zero instantaneous values, which eliminates the problem described earlier in this document.

The previous circuits have been implemented using N-channel MOSFET transistors though it must be clear to any expert in the matter that such circuits need not be limited to this type of transistor and can be replaced by others with the corresponding adaptation to the types of bias required (for example, P-channel MOSFETs).

We claim:
1. A DC/DC conversion circuit which comprises, in cascade: a DC/AC converter (M) receiving a DC supply voltage (Vi), a MOSFET self-driven synchronous rectifier (T1,T2) and a filter (L1,C1) producing a DC output voltage, wherein the DC/AC converter (M) includes means for generating an alternating signal with a square waveform having virtually no period of zero voltage.

2. The circuit according to claim 1, wherein the DC/AC converter (M) comprises:
   a first transformer (TR1) with two windings, in which a first winding has its two terminals connected, respectively, to the two input terminals (I1,I2) of the MOSFET self-driven synchronous rectifier (T1,T2) and a second winding has one of the terminals connected to the DC supply voltage (Vi),
   a first control circuit (CC1) that generates a first and a second control signals (Vc1, Vc2),
   a third field-effect transistors (T3) whose drain is connected to the other terminal of the second winding of the first transformer (TR1), its source is connected to a reference voltage (V0) and whose gate receives the first control signal (Vc1) coming from the first control circuit (CC1), and a magnetizing return current module (MRC) of the first transformer (TR1) that performs the demagnetizing of the first transformer (TR1) and which is connected between the node that joins the drain of the third field-effect transistor (T3) to one of the terminals of the second winding of the first transformer (TR1) and any constant voltage node of the DC/AC converter (M).

3. CIRCUIT according to claim 2, characterised in that the magnetising return current module (MRC) comprises:

a second capacitor (C2) which has one of its terminals connected to the DC supply voltage (Vi), and a fourth field-effect transistor (T4) whose drain is connected to the other terminal of the second capacitor (C2), its source is connected to the node that joins the drain of the third field-effect transistor (T3) to one of the terminals of the second winding of the first transformer (TR1), and whose gate receives a second control signal (Vc2) coming from the first control circuit (CC1).

4. CIRCUIT according to claim 2, characterised in that the magnetising return current module (MRC), in an alternative implementation, comprises:

a third capacitor (C3) which has one of its terminals connected to the reference voltage (V0), and a fifth field-effect transistor (T5) whose drain is connected to the other terminal of the third capacitor (C3), its source is connected to the node that joins the drain of the third field-effect transistor (T3) to one of the terminals of the second winding of the first transformer (TR1), and whose gate receives the second control signal (Vc2) coming from the first control circuit (CC1).

5. CIRCUIT according to claim 2, characterised in that the magnetising return current module (MRC), in another alternative implementation, comprises:

a first resistor (R1) connected between the DC supply voltage (Vi) and a first node (N1), a fourth capacitor (C4) connected in parallel with the first resistor (R1), and a first diode (D1) whose cathode is connected to the first resistor (R1) and to the fourth capacitor (C4) at the first node (N1), and its anode is connected to the node that joins the drain of the third field-effect transistor (T3) to one of the terminals of the second winding of the first transformer (TR1).

6. CIRCUIT according to claim 2, characterised in that the magnetising return current module (MRC), in another alternative implementation, comprises:

a second resistor (R2) whose terminals are connected, respectively, to the reference voltage (V0) and a second node (N2), a fifth capacitor (C5) connected in parallel with the second resistor (R2), and a second diode (D2) whose cathode is connected to the second resistor (R2) and to the fifth capacitor (C5) at the second node (N2), and its anode is connected to the node that joins the drain of the third field-effect transistor (T3) to one of the terminals of the second winding of the first transformer (TR1).

7. A DC/DC conversion circuit which comprises a DC/AC converter (M), a self-driven synchronous rectifier (T1, T2) and a filter (L1, C1), wherein the DC/AC converter (M) includes means for generating an alternating signal with a square waveform having virtually no period of zero voltage, and wherein the DC/AC converter (M), comprises:

a second transformer (TR2) with three windings, the first winding of which has its two terminals connected respectively to the two input terminals (I1, I2) of the self-driven synchronous rectifier (T1, T2), and the second and third windings have respectively one of their terminals connected to the DC supply voltage (Vi), a second control circuit (CC2) which generates a third and a fourth control signals (Vc3, Vc4), a sixth field-effect transistor (T6) whose drain is connected to the other terminal of the second winding of the second transformer (TR2), its source is connected to the reference voltage (V0) and whose gate receives the third control signal (Vc3) coming from the second control circuit (CC2), a third diode (D3) whose anode is connected to the other terminal of the second winding of the second transformer (TR2), and its anode to a third node (N3), a sixth capacitor (C6) connected between the third node (N3) and the reference voltage (V0), a second inductor (L2) with one of its terminals connected to the DC supply voltage (Vi), a seventh field-effect transistor (T7) whose drain is connected to the other terminal of the second inductor (L2) at a fourth node (N4), its source is connected to the reference voltage (V0) and whose gate receives the fourth control signal (Vc4) coming from the second control circuit (CC2), and a fourth diode (D4) whose anode is connected to one of the terminals of the second inductor (L2) and to the drain of the seventh field-effect transistor (T7) at the fourth node (N4), and its cathode is connected to the cathode of the third diode (D3) and to one of the terminals of the sixth capacitor (C6).

* * * * *